(12) United States Patent
Kretz et al.

(10) Patent No.: US 7,920,785 B2
(45) Date of Patent: Apr. 5, 2011

(54) SYSTEM AND METHOD OF PHOTOGRAPHY USING DESIRABLE FEATURE RECOGNITION

(75) Inventors: Martin Kretz, Lund (SE); Fredrik M. D. Ekstrand, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 12/604,645

(22) Filed: Oct. 23, 2009

(65) Prior Publication Data

US 2010/0039527 A1 Feb. 18, 2010

Related U.S. Application Data

(63) Continuation of application No. 11/751,071, filed on May 21, 2007, now Pat. No. 7,664,389.

(51) Int. Cl.
G03B 17/00 (2006.01)
G06K 9/46 (2006.01)

(52) U.S. Cl. ........................................ 396/263; 382/190

(58) Field of Classification Search .................. 396/121, 396/263; 382/118, 190
See application file for complete search history.

(56) References Cited

U.S. PATENT DOCUMENTS

| | | | |
|---|---|---|---|
| 6,996,340 B2 | 2/2006 | Yamaguchi et al. | |
| 7,034,881 B1 | 4/2006 | Hyodo et al. | |
| 7,440,621 B2 | 10/2008 | Iguchi et al. | |
| 2003/0160879 A1* | 8/2003 | Robins et al. | 348/239 |
| 2004/0207743 A1* | 10/2004 | Nozaki et al. | 348/333.12 |
| 2004/0246342 A1* | 12/2004 | Kim et al. | 348/207.99 |
| 2005/0207648 A1* | 9/2005 | Iguchi et al. | 382/190 |
| 2006/0181614 A1 | 8/2006 | Yen et al. | |
| 2007/0086761 A1 | 4/2007 | Okamoto | |
| 2007/0269196 A1 | 11/2007 | Misawa | |

FOREIGN PATENT DOCUMENTS

JP 2006-340281 12/2006

OTHER PUBLICATIONS

International Preliminary Report on Patentability for corresponding Application No. PCT/IB2007/003565 dated Aug. 13, 2009.
International Search Report and Written Opinion for corresponding Application No. PCT/IB2007/003565 dated Apr. 28, 2008.

* cited by examiner

*Primary Examiner* — W. B. Perkey
*Assistant Examiner* — Noam Reisner
(74) *Attorney, Agent, or Firm* — Renner, Otto, Boisselle & Sklar, LLP

(57) ABSTRACT

To improve the quality of photographs of people, the disclosure describes a system and method of photography using desirable feature recognition. The system and method recognize when the subject persons in a photograph possess one or more desirable features for a desirable photograph, such as when they are all smiling and/or not blinking. The system and method may be applied either to individual or group photographs. The system and method of the present invention may operate in a "Full Mode", in which a picture is taken when all subject persons possess the desirable feature(s). The system and method also may operate in a "Proportional Mode", in which a picture is taken when a set proportion of the subject persons possess the desirable feature(s). The system and method also may operate in a "Best Picture Mode", in which multiple photographs are imaged, and the best photograph is selected for keeping, as measured by the photograph containing the highest proportion of subject persons who possess the desirable feature(s). The system and method also may operate in a timer mode, which permits the camera user to appear in the photograph.

11 Claims, 8 Drawing Sheets

FIG 6.
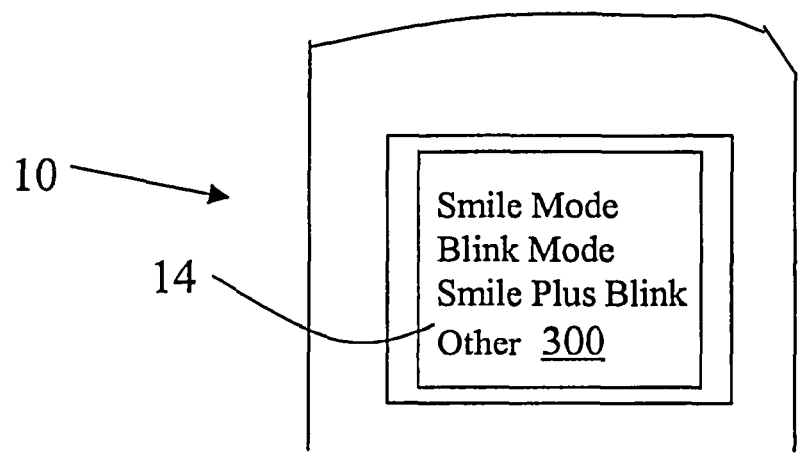
FIG. 6A
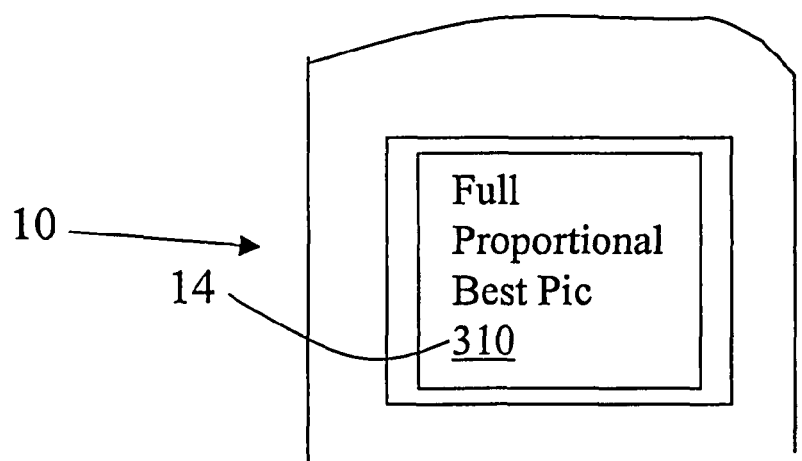
FIG. 6B
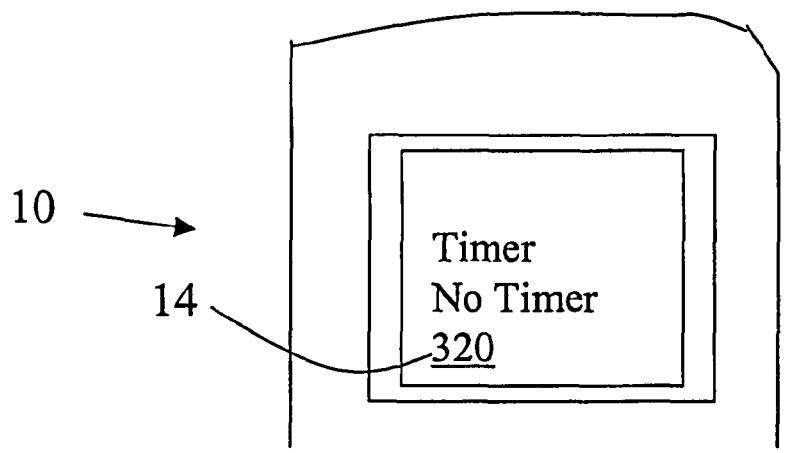
FIG. 6C

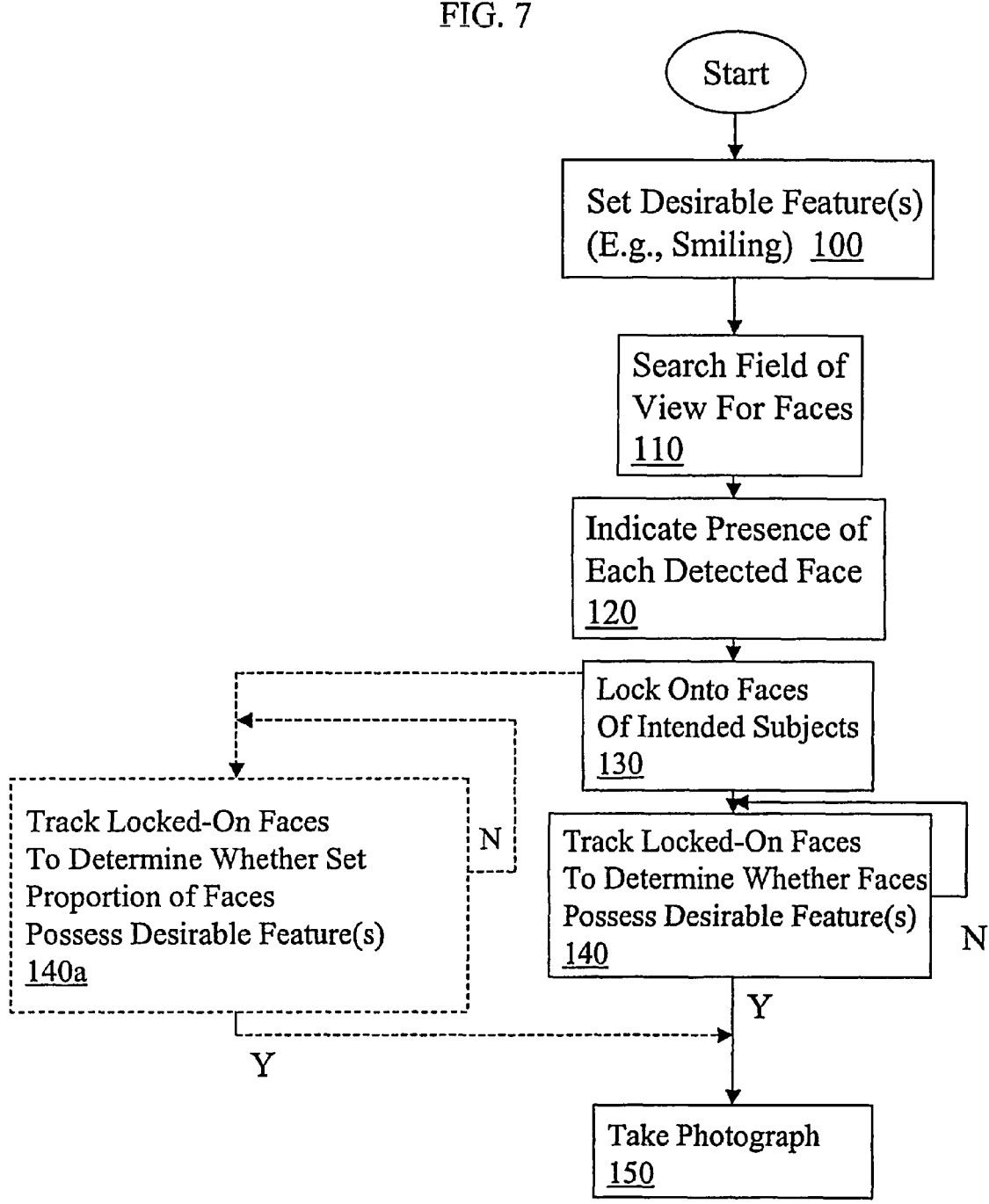

SYSTEM AND METHOD OF PHOTOGRAPHY USING DESIRABLE FEATURE RECOGNITION

RELATED APPLICATION DATA

This application is a continuation of copending application Ser. No. 11/751,071, filed on May 21, 2007, the entire disclosure of which is incorporate herein by reference.

TECHNICAL FIELD OF THE INVENTION

The technology of the present disclosure relates generally to photography, and, more particularly, to a system and method for photography based on desirable feature recognition. Desirable features may include parameters for considering whether a photograph is desirable, such as when the subject persons of a photograph are smiling, and/or not blinking.

DESCRIPTION OF THE RELATED ART

Digital cameras, in addition to standalone models, increasingly are being incorporated into other electronic devices, such as mobile telephones, media players, personal digital assistants (PDAs), and others. As the use of digital cameras increases, users, whether for professional or leisure purposes, are continuously looking for new ways to improve their photographs, particularly of people. Sometimes, a picture is taken at a precise moment when a subject happens not to be smiling, or is blinking. If such a photograph is taken with a digital camera, the photograph can be viewed immediately, and must be deleted and retaken. Also, resolution of the display may not be sufficiently precise to determine whether all subjects in a photograph have smiles and open eyes. The result is inconvenience and wasted time. If the photograph is taken with a traditional film camera, the hardship is greater because one will not become aware of the poor picture quality until after the film is developed. In such a case, the photographic opportunity is lost.

The difficulties associated with photographing people multiply with group-photographs. The larger the group, the more difficult it is to obtain a photograph in which everyone is smiling and not blinking. The difficulty is even greater when photographing groups of people with a tendency not to cooperate, such as small children.

Face detection capabilities are known in the art. In face detection, one detects whether or not a face is present in an image using shape, orientation, and/or color of common facial features. However, such technology has not been successfully incorporated into cameras to ensure that photographs are taken of a desirable quality.

Various camera options for improving photograph quality are known in the art. For example, camera operators may adjust such settings as shutter speed, resolution, red-eye reduction, and zoom range to increase the likelihood of a desirable photograph. However, none of the camera features in the prior art account specifically for facial expressions, such as whether someone is smiling or blinking.

Timer settings also are known in the art. Timer settings permit a camera operator to be in a photograph by providing a delay between the time the shutter is activated and the time the photograph is taken. With such a feature, the time delay is the sole factor that governs when the picture is taken. Thus, at the end of the delay, the picture is taken regardless of whether the resultant photograph would be desirable.

SUMMARY

To improve the quality of photographs of people, there is a need in the art for a system and method for recognizing when the subject persons in a photograph to be taken satisfy or possess certain desirable features for a desirable photograph, such as when they are all smiling and/or not blinking. The system and method of the present disclosure may be implemented in a manner that notifies the operator when the subject person or persons possess the desirable features. The system and method may be applied either to individual or group photographs.

The system and method of the present disclosure may operate in a "Full Mode", in which a picture is taken when all subject persons satisfy or possess the desirable features. The system and method also may operate in a "Proportional Mode", in which a picture is taken when a predetermined proportion of the subject persons possess the desirable features. The system and method also may operate in a "Best Picture Mode", in which multiple photographs are imaged, and the best photograph is selected for keeping, as measured by the photograph containing the highest proportion of subject persons who possess the desirable features. The system and method also may incorporate a timer setting, which permits the camera user to appear in the photograph.

Therefore, according to one aspect of the invention, a first method of taking a photograph with a digital camera includes setting a desirable feature for a desirable photograph, searching a field of view of the camera for at least one face, determining whether a face possesses the desirable feature, and upon determining that a face possesses the desirable feature, imaging a photograph.

According to one embodiment of the first method, the desirable feature includes that a face in the field of view of the camera is smiling.

According to one embodiment of the first method, the desirable feature includes that the eyes of a face in the field of view of the camera are open.

According to one embodiment of the first method, the field of view contains two or more faces, and the method includes imaging a photograph when all of the faces possess the desirable feature.

According to one embodiment of the first method, the field of view contains two or more faces, and the method includes imaging a photograph when a predetermined proportion of the faces possess the desirable feature.

According to one embodiment of the first method, the digital camera has a display and the method further includes indicating in the display the presence of each of the faces within the field of view, locking onto the indicated faces when the indicated faces include only the faces of the intended subject persons of a photograph, tracking the locked-on faces to determine when a predetermined proportion of the locked-on faces possess the desirable feature, and imaging a photograph when a predetermined proportion of the locked-on faces possess the desirable feature.

According to one embodiment of the first method, the field of view contains two or more faces and the digital camera has a display, wherein the method further includes indicating in the display the presence of each of the faces in the field of view, locking onto the indicated faces when the indicated faces include only the faces of the intended subject persons of a photograph, imaging multiple images containing the locked-on faces, displaying the multiple images in the display, and selecting which of the multiple images contains the highest proportion of faces that possess the desirable feature.

According to one embodiment of the first method, the method further includes deleting the images other than the image which contains the highest proportion of faces that possess the desirable feature.

According to another aspect of the invention, a second method of taking a photograph with a digital camera includes setting a desirable feature for a desirable photograph, receiving a time delay, and following the time delay, searching the field of view of the camera for at least one face, determining whether a face possesses the desirable feature, and upon determining that a face possess the desirable feature, imaging a photograph.

According to one embodiment of the second method, the method further includes alerting the user that a photograph has been taken.

According to one embodiment of the second method, the field of view contains two or more faces, and the method further includes tracking the faces to determine when all of the faces possess the desirable feature, and imaging a photograph when all of the faces possess the desirable feature.

According to one embodiment of the second method, the field of view contains two or more faces, and the method further includes tracking the faces to determine when a predetermined proportion of the faces possess the desirable feature, and imaging a photograph when a predetermined proportion of the faces possess the desirable feature.

According to one embodiment of the second method, the field of view contains two or more faces, and the method further includes imaging multiple images containing the faces, displaying the multiple images in the display, and selecting which of the multiple images contains the highest proportion of faces that possess the desirable feature.

According to one embodiment of the second method, the method further includes deleting the images other than the image which contains the highest proportion of faces that possess the desirable feature.

According to another aspect of the invention, a camera assembly includes a sensor for imaging a field of view, and a controller that receives an input of a desirable feature for a desirable photograph, and further searches the output of the sensor representing a field of view of the camera for at least one face, determines whether a face possesses the desirable feature, and upon determining that a face possesses the desirable feature, images a photograph.

According to one embodiment of the camera assembly, the camera assembly further includes a memory that stores executable code that is executed by the controller.

According to one embodiment of the camera assembly, the camera assembly further includes a display wherein the controller executes the code to indicate in the display the presence of one or more faces within the field of view, and wherein the controller further executes the code to lock onto the indicated faces when the indicated faces include only the faces of the intended subject persons of a photograph, track the locked-on faces to determine when a predetermined proportion of the locked-on faces possess the desirable feature, and image a photograph when a predetermined proportion of the locked-on faces possess the desirable feature.

According to one embodiment of the camera assembly, the camera assembly further includes a display wherein the controller executes the code to indicate in the display the presence of one or more faces within the field of view, and wherein the controller further executes code to lock onto the indicated faces when the indicated faces include only the faces of the intended subject persons of a photograph, image multiple images containing the locked-on faces, display the multiple images in the display, and select which of the multiple images contains the highest proportion of faces that possess the desirable feature.

According to one embodiment of the camera assembly, the controller further executes the code to delete the images other than the image which contains the highest proportion of faces that possess the desirable feature.

According to one embodiment of the camera assembly, the camera assembly further includes a timer wherein the timer can receive a time-delay input to delay the execution of the code by the controller, and an alert to alert a user when a picture has been taken.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIGS. 6A-C are schematic diagrams depicting an exemplary menu system for use with a mobile telephone in accordance with the present disclosure.

FIG. 7 is a flow chart representing an exemplary method of taking a group photograph in a "Full Mode" or a "Proportional Mode" in accordance with the present disclosure.

DETAILED DESCRIPTION OF EMBODIMENTS

Figure 1:
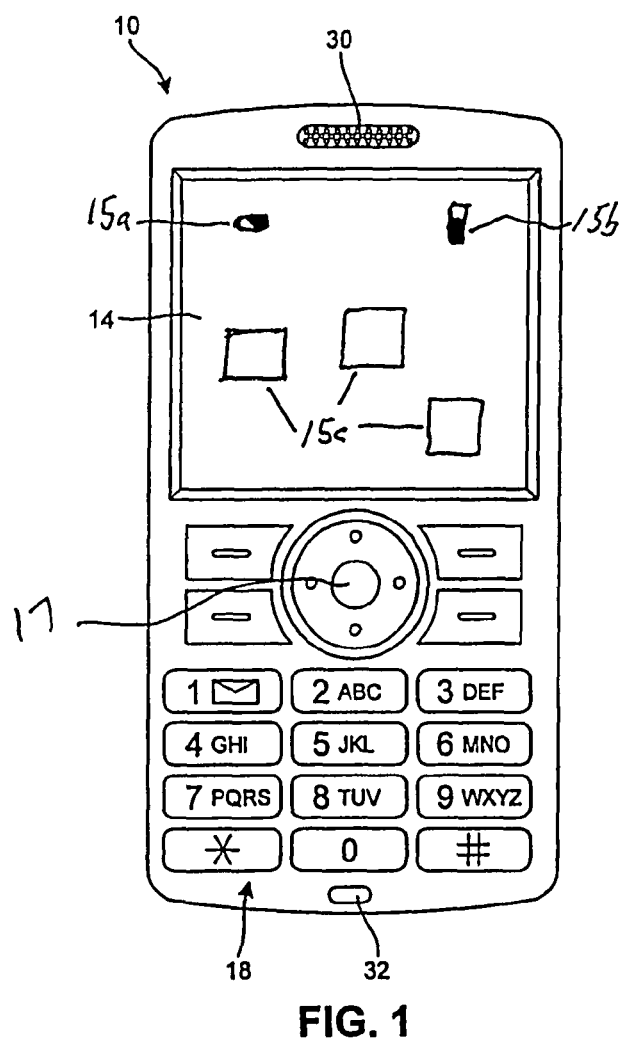
FIG. 1 is a schematic front view of a mobile telephone that has a camera assembly as an exemplary electronic device in accordance with an embodiment of the present disclosure.

Embodiments of the present disclosure will now be described with reference to the drawings, wherein like reference numerals are used to refer to like elements throughout. It will be understood that the figures are not necessarily to scale.

Aspects of this method and system invention relate to photography. The techniques described herein may be applied to taking photographs with a digital still camera, but it will be appreciated that the techniques described herein also may be used in conjunction with a film camera, if the camera is equipped with the suitable sensors as described herein.

Any type of electronic device that includes a camera may carry out the techniques described herein. For instance, a dedicated still camera may be constructed in accordance with the present invention. As another example, many mobile telephones include cameras that may be constructed in accordance with the present invention. The following description is made in the context of a mobile telephone that includes a camera assembly. However, it will be appreciated that the invention is not intended to be limited to the context of a mobile telephone and may relate to any type of appropriate electronic equipment, examples of which include a dedicated camera, a media player that includes a camera, a gaming device that includes a camera, and a computer that includes a camera. For purposes of the description herein, the interchangeable terms "electronic equipment" and "electronic device" include portable radio communication equipment. The term "portable radio communication equipment," which sometimes hereinafter is referred to as a "mobile radio terminal," includes all equipment such as mobile telephones, pagers, communicators, electronic organizers, personal digital assistants (PDAs), smartphones, and any portable communication apparatus or the like.

Figure 2:
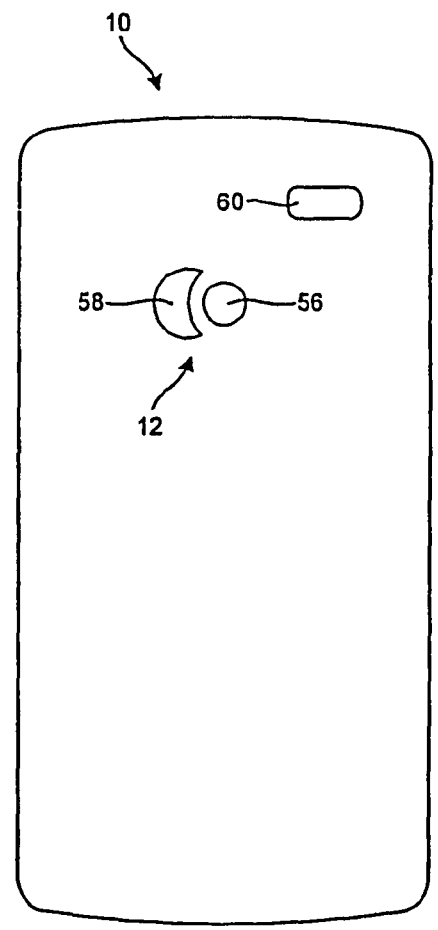
FIG. 2 is a schematic rear view of the mobile telephone of FIG. 1.
Figure 3:
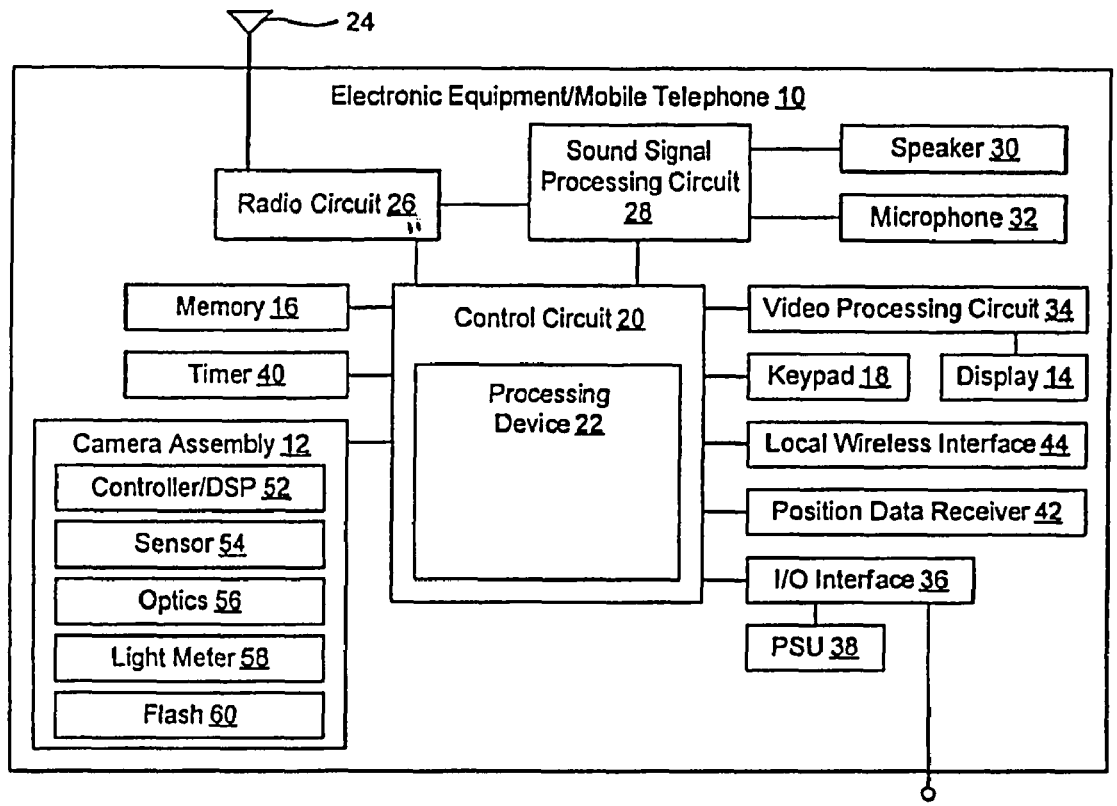
FIG. 3 is a schematic block diagram of operative portions of the mobile telephone of FIG. 1.

Referring initially to FIGS. 1 through 3, an electronic device 10 is shown. The electronic device 10 includes a camera assembly 12 that is configured to conduct facial detection, including smile and blink detection, in a field of view of the camera. Additional details and operation of the camera assembly 12 will be described in greater detail below. The detection techniques described herein may be embodied as executable code that is resident in and executed by the electronic device 10. In one embodiment, the camera assembly 12 and/or the electronic device 10 may include a controller or processor that executes a program stored on a computer or machine-readable medium. The program may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other type housings, such as a clamshell housing (e.g., a "flip" open housing) or a slide-type housing, may be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 3) of the mobile telephone 10. The display 14 may be used to present images, video and other graphics to the user, such as photographs, mobile television content and video associated with games.

Also, the display 14 may be used as an electronic viewfinder for the camera assembly 12. Additionally, the mobile telephone may have a separate optical or electronic viewfinder (not shown in this example), much like the viewfinder of a standalone camera. As an exemplary embodiment, the present disclosure is in the context of the display 14 being used as the camera viewfinder. It will be appreciated that a separate viewfinder can be used as an alternative to display 14 without departing from the scope of the invention.

The display 14 also may display various indicators 15, which provide information to the user regarding various aspects of camera function. Such indicators may include items like a battery meter 15a and a memory space meter 15b. Display 14 also may display one or more box indicators 15c, which are used in connection with the present invention. The box indicators 15c can indicate any faces within the field of view, as is further described below.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 14. Special function keys may include audiovisual content playback keys to start, stop and pause playback, skip or repeat tracks, and so forth. Other keys associated with the mobile telephone may include a volume key, an audio mute key, an on/off power key, a web browser launch key, etc. Some or all of the keys may be used in conjunction with the display as soft keys. Keys or key-like functionality also may be embodied as a touch screen associated with the display 14. When the camera assembly 12 is activated, keys from the keypad 18 may be used to control operation of the camera assembly 12. For instance, one of the keys may serve as a shutter button 17, and other keys may control the zoom of the camera assembly.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi, WiMax, etc. Another example includes a video enabled call that is established over a cellular or alternative network.

The mobile telephone 10 may be configured to transmit, receive, and/or process data such as text messages (e.g., colloquially referred to by some as "an SMS," which stands for simple message service), electronic mail messages, multimedia messages (e.g., colloquially referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 3 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. The memory 16 may be, for example, one or more of a buffer, a flash memory, a hard drive, a removable media, a volatile memory, a non-volatile memory or other suitable device.

Continuing to refer to FIGS. 1 through 3, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal hands free (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20. The mobile telephone 10 also may include a position data receiver 42, such as a global positioning system (GPS) receiver, Galileo satellite system receiver or the like.

The mobile telephone 10 also may include a local wireless interface 44, such as an infrared transceiver and/or an RF adaptor (e.g., a Bluetooth adapter), for establishing communication with an accessory, another mobile radio terminal, a computer or another device. For example, the local wireless interface 44 may operatively couple the mobile telephone 10 to a headset assembly (e.g., a PHF device) in an embodiment where the headset assembly has a corresponding wireless interface.

Figure 4:
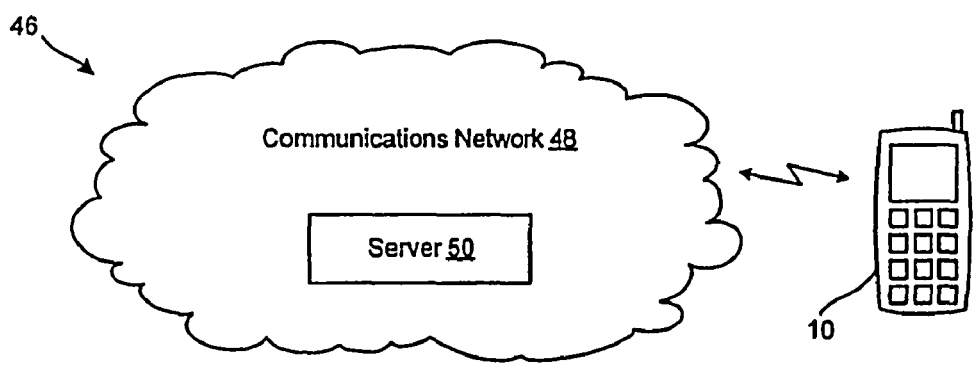
FIG. 4 is a schematic diagram of a communications system in which the mobile telephone of FIG. 1 may operate.

With additional reference to FIG. 4, the mobile telephone 10 may be configured to operate as part of a communications system 46. The system 46 may include a communications network 48 having a server 50 (or servers) for managing calls placed by and destined to the mobile telephone 10, transmitting data to the mobile telephone 10 and carrying out any other support functions. The server 50 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 48 may support the communications activity of multiple mobile telephones 10 and other types of end user devices. As will be appreciated, the server 50 may be configured as a typical computer system used to carry out server functions and may include a processor configured to execute software containing logical instructions that embody the functions of the server 50 and a memory to store such software.

With continuing reference to FIGS. 1 through 3, the camera assembly 12 may include a controller 52, such as a digital signal processor (DSP). In other embodiments, some or all of the camera assembly 12 control functions that are described as being carried out by the controller 52 may be carried out by the control circuit 20 and the controller 52 may be downsized or omitted. The controller 52 controls various aspects of camera assembly 12 operation including, but not limited to, metering operations and management of exposure settings. The controller 52 may coordinate storage of image and/or video data captured with camera assembly 12. For instance, the image and/or video data may be stored by the memory 16 in corresponding image files and/or video files.

The controller 52 may execute code to implement the camera assembly 12 control functions. It will be apparent to a person having ordinary skill in the art of computer programming, and specifically in application programming for cameras, mobile telephones or other electronic devices, how to program a camera and/or mobile telephone to operate and carry out logical functions associated with the control of the camera assembly 12. Accordingly, details as to specific programming code have been left out for the sake of brevity. Also, while such code is executed by the controller 52 in accordance with an exemplary embodiment, such functionality could also be carried out via dedicated hardware, firmware, software, or combinations thereof, without departing from the scope of the invention.

In the illustrated embodiment, the camera assembly 12 is a digital camera that uses a sensor 54 to image a field of view as determined by imaging optics 56 of the camera assembly. A light meter 58 may detect illumination conditions across the field of view. A flash 60 may be present to offer supplemental illumination during taking of a photograph.

With reference to FIGS. 5, 7, 8, 9, and 10, illustrated are logical operations to implement exemplary methods of the operation of the camera assembly 12. The exemplary methods may be carried out by executing code with the controller 52. Thus, the flow charts of FIGS. 5, 7, 8, 9, and 10 may be thought of as depicting steps of a method carried out by the camera assembly 12. Although FIGS. 5, 7, 8, 9, and 10 show a specific order of executing functional logic blocks, the order of executing the blocks may be changed relative to the order shown. Also, two or more blocks shown in succession may be executed concurrently or with partial concurrence. It is understood that all such variations are within the scope of the present disclosure.

Figure 5:
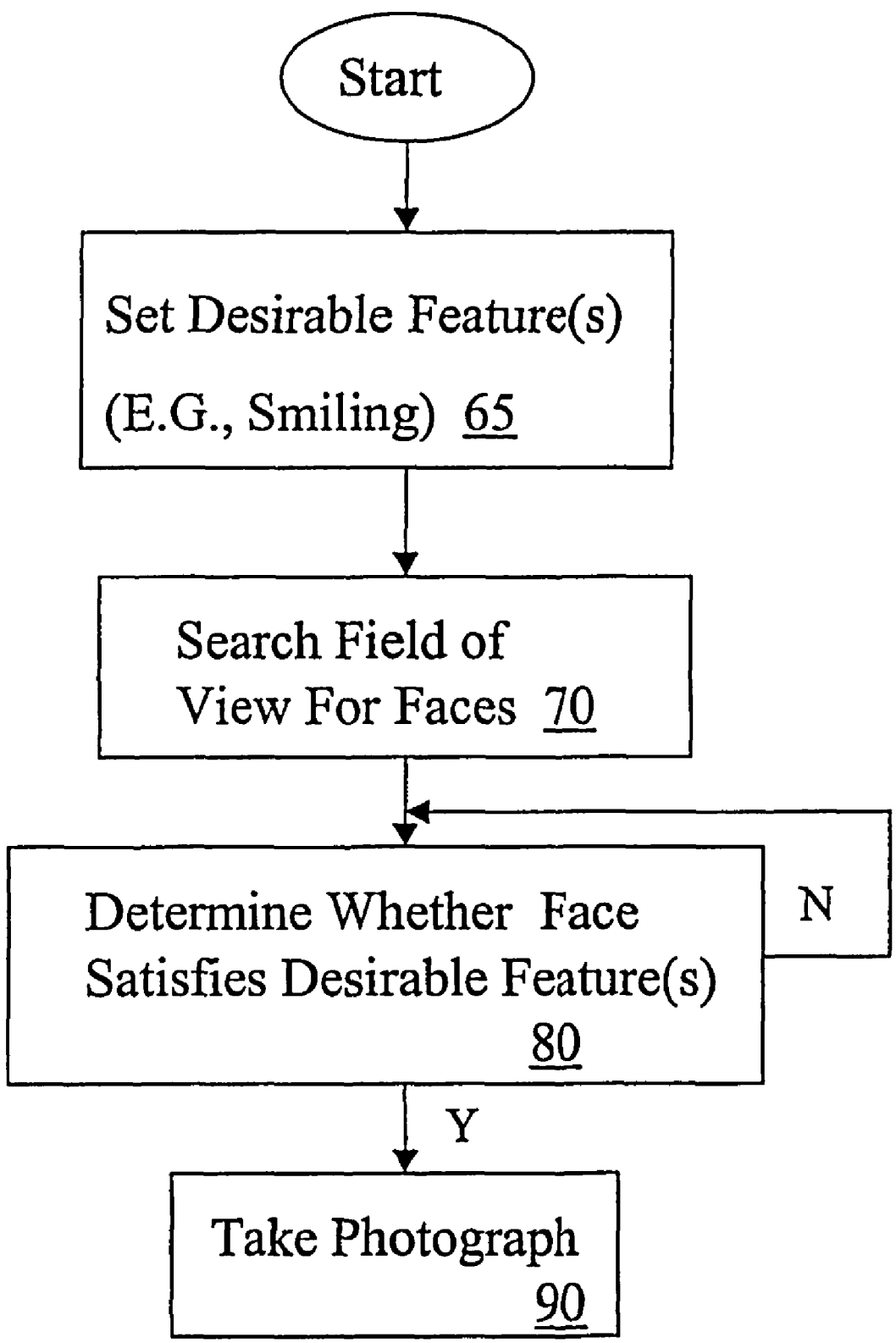
FIG. 5 is a flow chart representing an exemplary method of taking a photograph in accordance with the present disclosure.

FIG. 5 illustrates an embodiment of the disclosed method in connection with the photograph of a single individual. At step 65, one or more desirable features are set as to the picture to be taken. The desirable feature or features represent parameters that a user may regard as being characteristic of an acceptable picture. In one embodiment, the desirables features include the presence of a smile. In another embodiment, the desirable features include the lack of blinking. In a third embodiment, the desirable features include both the presence of a smile and the lack of blinking.

By way of example, the method of this disclosure is described primarily in connection with taking photographs in which the subject person or persons are preferably smiling. It will be appreciated, however, that the desirable features may constitute any facial feature or combination of facial features deemed desirable by the photographer. The desirable features may also include environmental factors, such as, for example, a particular level of lighting or a lack of motion. Thus, various desirable features may be envisioned without departing from the scope of the invention.

There are various mechanisms by which the desirable features may be set. In an exemplary embodiment, the mobile telephone 10 includes a selectable mode of operation, which the user may select from a conventional main menu. By way of an example, the mode representing the functionality described herein is given the name: "Time To Smile". Time To Smile mode may be selected from a conventional menu displayed on display 14. Alternatively, Time To Smile mode may be entered by pushing one or more of the buttons on keypad 18 dedicated for such purpose. Once Time To Smile mode is entered, the desirable features may be selected. In one embodiment, the desirable features are present and fixed at the time of manufacture. Alternatively, as shown in FIG. 6A, selecting Time To Smile prompts the mobile telephone 10 to display on display 14 a sub-menu 300, which includes choices of desirable features from which the user may choose depending on the circumstances. In FIG. 6A, exemplary choices include Smile Mode, Blink Mode, Smile Plus Blink, and Other (for user defined desirable features). For the purposes of this example, the user chooses Smile Mode to maximize the likelihood that the picture will be taken when the subject person is smiling.

Referring again to FIG. 5, once the desirable features are set, the method proceeds to step 70, in which the camera searches the field of view to detect a face. In an exemplary embodiment, the user may initiate face detection by half-pushing the shutter button 17 (see FIG. 1). The half-push has been used in the art for initiating certain camera features, such as red-eye reduction or auto-focus. Face detection likewise may be initiated in this manner. In one implementing embodiment, when a face is detected in the field of view, a box indicator 15c (see FIG. 1) is generated around the subject face on display 14. The box indicator may be colored, such as green or red, to enhance the visibility of the indicator.

Once the face is detected, the user may then push shutter button 17 fully to lock onto the subject face and initiate smile detection, which initiates step 80 in FIG. 5.

Locking onto the subject face means that the smile detection will be performed only as to that particular subject. Visually, the lock-on is indicated in the display by box indicator 15c remaining around the locked-on face, but no new box indicators appear. Accordingly, faces other than that of the subject are not tracked for smile detection. For example, should a bystander enter the background of the field of view, the bystander's face is not subjected to smile detection. At step 80 the camera then determines whether the subject face possesses the desirable features set in step 65. In the context of this example, the camera determines whether the subject person is smiling.

If no smile is detected, the camera will remain at step 80 and continuously monitor and track the face until such time as a smile is detected. Once detected, the method proceeds to step 90, and the photograph is taken. In one embodiment, the method may incorporate a "time-out" function. With this feature, if no smile is detected within a given number of seconds, the method is aborted.

Face and feature (e.g., smile and/or blink) detection may be accomplished as follows. In operation, as stated above with reference to FIG. 3, camera assembly 12 includes a sensor 54 to image a field of view by imaging optics 56. Face and feature detection may be accomplished by modifying known face detection software to distinguish as to whether a subject is smiling, blinking, or possesses some other desirable feature. The software may be programmed into the phone and stored in memory 16 as executable code, which may then be executed by camera controller 52. Alternatively, these functions may be carried out by the control circuit 20 of the mobile telephone 10.

Although the invention has been described with reference to photographing an individual, the method may be useful for improving group photographs. An embodiment of the method as applied to group photographs is depicted in FIG. 7. As in the previous example, the user begins by entering Time To Smile mode and setting the desirable features, shown as step 100. At step 110, the user may employ a half-push of the shutter button 17, and the camera initiates face detection to search the field of view for faces. Now, the intended photograph is to include two or more faces.

Often, it is desirable to take a group photograph at a crowded location, such as a tourist site, park, or the like. At such locations, sometimes persons other than the intended subject persons may enter the field of view. The camera user may wish to wait until such persons leave the field of view, or if such persons are in the background, the user at least does not care if those persons are looking at the camera and smiling. There is a need, therefore, to distinguish between the intended subjects of the photograph and bystanders.

Accordingly, at step 120, with the shutter button 17 at half-push, the display indicates each of the detected faces. As before, one way this can be done is by generating a box indicator 15c in the display 14 around each of the detected faces. In this example, box indicator 15c is green. When the camera user sees that green boxes appear only around the intended subject persons, the user may proceed to step 130 by fully pushing the shutter button. At step 130, the camera locks onto those faces within green boxes, which means that the camera processing is applied to the intended subject persons, to the exclusion of bystanders who may enter the field of view. Similar to photographs of individuals described above, locking onto the subject faces in a group photograph means that smile detection will be performed as to those particular subjects. Visually, the lock-on is indicated in the display by box indicators 15c remaining around the locked-on faces, but no new green boxes appear. Accordingly, faces other than those of the subjects are not tracked for smile detection. For example, should a bystander enter the background of the field of view, the bystander's face is not subjected to smile detection.

At step 140, the camera tracks the locked-on faces and performs smile detection to determine whether the locked-on faces are smiling (the set desirable feature for this example). Once it is determined that everyone is smiling, the method proceeds to step 150, and the picture is taken.

Sometimes, it may be improbable, if not nearly impossible, for every member of a group to possess the desirable features all at one instant. Such may be the case if the group is particularly large, or if the group is composed of individuals who may not be cooperative, such as small children. Under such circumstances, it would be preferable to be able to take a picture without full compliance with the desirable features by every member of the group. In one embodiment, step 140 may call for full satisfaction of the desirable features, in which case this feature is referred to as "Full Mode".

As an alternative to Full Mode step 140 in FIG. 7, the method may call for satisfaction of the desirable features by some portion of the subject persons, which will be referred to as "Proportional Mode". In Proportional Mode, step 140a is performed as an alternative to step 140, as indicated by dashed lines in FIG. 7. In step 140a, the locked-on faces are tracked to determine when a predetermined proportion of the subjects possess the desirable features. In an exemplary embodiment, Proportional Mode may be a choice in a Time To Smile sub-menu 310, as depicted in FIG. 6B. To set the proportion amount, the mobile telephone 10 may generate a prompt on display 14 requesting a proportion amount, which the user may then enter with keypad 18. The proportion amount may be any amount less than the total number of faces being tracked. Conveniently, the proportion may be a common percentage, such as 50 percent, 75 percent, etc. Alternatively, the amount may be set as a subset of green boxes in the display 14 versus the total number. For example, if the display 14 depicts ten green boxes, meaning ten faces are being tracked, then the user may enter the proportion amount as 7, 8, etc. In this manner, the user may take a picture without having to wait for every member of the group to possess the desirable features. It will be appreciated that the precise mechanism of setting the proportion amount may be varied from the above without departing from the scope of the invention.

Figure 8:
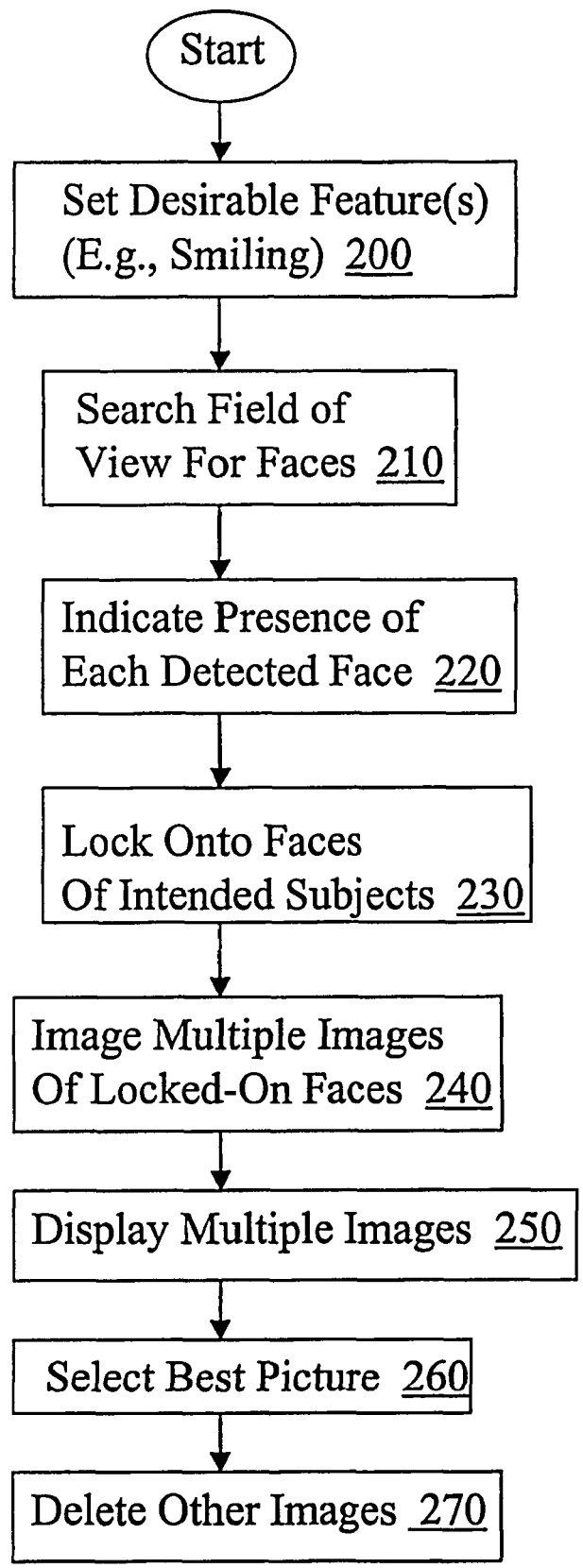
FIG. 8 is a flow chart representing an exemplary method of taking a group photograph in a "Best Picture Mode" in accordance with the present disclosure.

FIG. 8 depicts an alternative embodiment for taking a group photograph. This embodiment will be referred to as "Best Picture Mode". In contrast to the Proportional Mode, in Best Picture Mode the photograph is not imaged upon detecting a predetermined proportional satisfaction of the desirable features. Rather, multiple images are made and displayed, and then the image containing the highest proportional satisfaction of the desirable features may be selected. The remaining images may be deleted.

Referring more specifically to FIG. 8, the method of this embodiment proceeds similar to the previous embodiments. The user may begin by entering Time To Smile mode and selecting the desirable features, shown at step 200. At step 210, the user may employ a half-push of the shutter button, and the camera initiates face detection to search the field of view for faces. At step 220, with the shutter button at half-push, the display indicates each of the detected faces. As before, this may be done by the camera generating a box indicator 15c in the display 14 around each of the detected faces. When the camera user sees that boxes appear around the intended subject persons, the method proceeds to step 230, which may be initiated by the user fully pushing shutter button 17. At step 230, the camera locks onto those faces within the boxes indicators, the intended subject persons, to the exclusion of bystanders who may enter the field of view.

The embodiment of FIG. 8, Best Picture Mode, departs from the previous embodiment, Proportional Mode, at step 240. Rather than track the locked-on faces, in Best Picture Mode the camera images multiple images of the scene containing the locked-on faces. At step 250, the multiple images are displayed on display 14. At step 260, smile detection may then be applied to the multiple images to determine and select the "best picture", which may be defined as the picture in which the highest proportion of the subject persons are smiling (or possess the chosen desirable feature or features). The selected best picture may be retained, such as by storing the picture in memory 16. In one embodiment, the best picture may be selected automatically by the camera assembly 12 based solely on the proportional satisfaction of the desirable features. Alternatively, the user may view and manually select the best picture from the multiple images on display 14.

Figure 9:
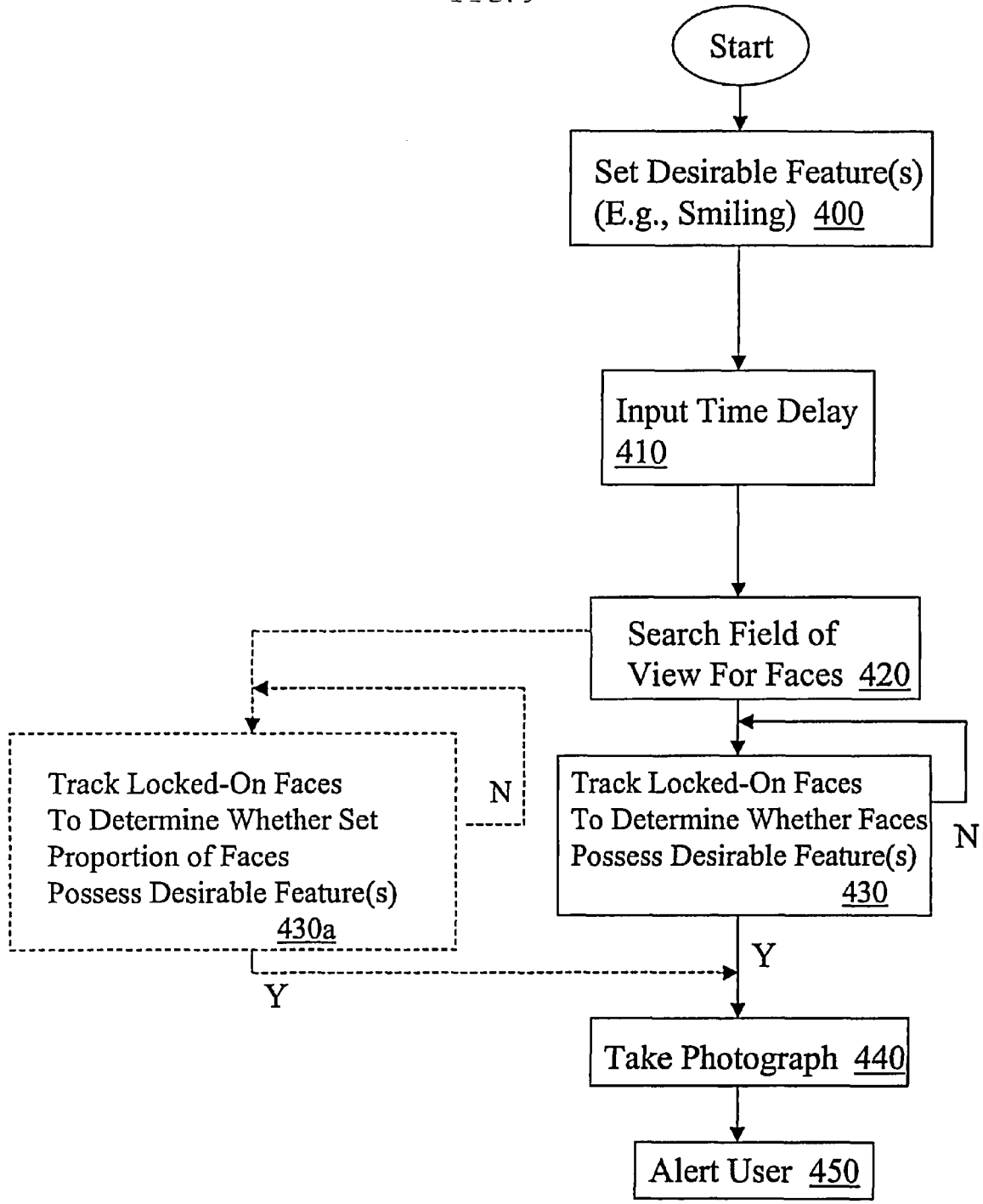
FIG. 9 is a flow chart representing an exemplary method of taking a group photograph using a timer in a "Full Mode" or a "Proportional Mode" in accordance with the present disclosure.
Figure 10:
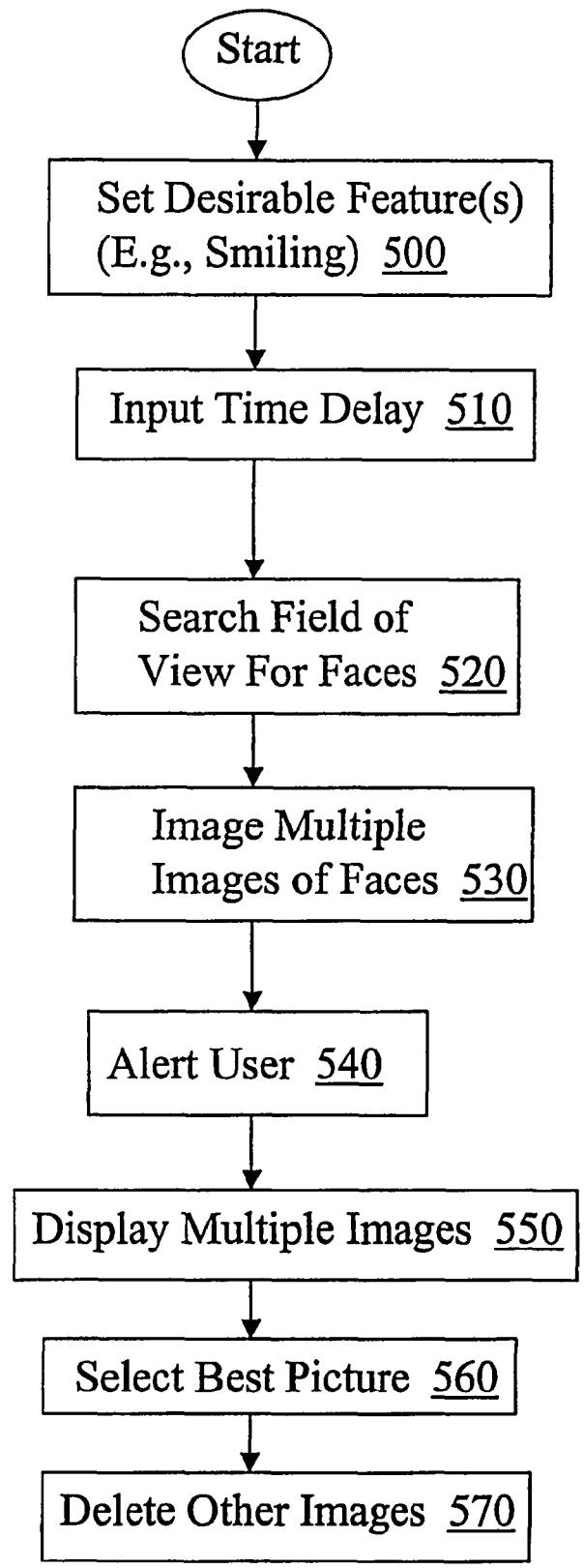
FIG. 10 is a flow chart representing an exemplary method of taking a group photograph using a timer in a "Best Picture Mode" in accordance with the present disclosure.

Referring to FIGS. 9 and 10, a time delay 410 or 510 is provided as part of the methods described herein. Timer modes are known in the art, and they generally permit the camera user to appear in a group photograph. The timer function may be performed by the cooperation of controller 52 of the camera assembly 12, with the system clock 40 of the mobile telephone 10. In another embodiment, a separate timer (not shown) may be included as part of camera assembly 12. The user may set the time delay. Upon pressing the shutter button 17, the timer begins its countdown. Alternatively, the user may use a conventional remote control to activate the shutter mechanism and initiate the timer countdown. During the delay, the camera user may position himself such that he will appear in the picture. With prior art timers, the picture is taken when the time delay is exhausted. Such prior art timer methods are deficient in that the picture is taken at the end of the time delay regardless of whether the resultant picture would be desirable.

In an exemplary embodiment, the user may enter a timer mode, either from a Time To Smile sub-menu 320 (see FIG. 6C) or by other means. The user may set a time delay subsequent to setting the desirable features, by, for example, using the keypad 18 to enter a number of seconds of delay. The user may initiate the timer countdown by pushing shutter button 17, or alternatively by using a remote control, to activate the shutter mechanism. During the delay, the user may position himself to be included in the photograph to be taken. In contrast to prior art timer methods, at the end of the time delay the camera does not take the photograph. Rather, face detection is initiated, and the method proceeds according to steps similar to those described previously.

FIG. 9 depicts the use of the timer feature as part of Full Mode or Proportional Mode. The user sets the desirable features (step 400) and then inputs a time delay (step 410). After pushing shutter button 17 or a remote control button to initiate the timer countdown, at step 420 the camera searches the field of view for faces. When using the timer, the camera user may not remain at the camera once the shutter mechanism is activated. Therefore, an indicating step and a locking step (comparable to steps 120 and step 130 of FIG. 7) may not be employed. In Full Mode, at step 430 the faces are tracked until all of them posses the desirable features. Alternatively, as indicated with dashed lines in FIG. 9, Proportional Mode step 430a may be used, and the faces are tracked until only a predetermined proportion of faces possess the desirable features. The picture is then taken at step 440. At step 450, an alert feature may notify the user (who may be in front of the camera) that the picture has been taken. As examples, the alert may originate from the camera flash 60, a separate LED indicator (not shown), or a tone from speaker 30.

FIG. 10 depicts the use of the timer feature as part of the Best Picture Mode. The user sets the desirable features (step 500) and then inputs a time delay (step 510). After pushing shutter button 17 or a remote control to initiate the timer countdown, at step 520 the camera searches the field of view for faces. Again, when using the timer, the camera user may not remain at the camera once the shutter mechanism is activated. Therefore, an indicating step and a locking step (comparable to steps 220 and 230 of FIG. 8) may not be employed. Multiple images are generated at step 530. Subsequently, at step 540 an alert feature may notify the user that the images have been generated. The multiple images are displayed at step 550. The user may then return to the camera to view the multiple images and select the best picture (step 560). The user also may delete the other images (step 570). Alternatively, as described before, the camera assembly 12 may automatically select the best picture.

FIGS. 6A-6C illustrate an exemplary scroll-down menu system for selection among the variations of the methods described herein. The user may begin by selecting Time To Smile from a conventional main menu (not shown), or alternatively by pressing a dedicated button on the keypad 18. The display 14 then may display sub-menu 300 (FIG. 6A) for selecting an option for the desirable features. Examples above have been described as if the user had selected "Smile Mode". FIG. 6A illustrates other possibilities for desirable features such as "Blink Mode" and "Smile Plus Blink". A category "Other" is shown, which may permit user-defined desirable features. After the desirable features are selected, display 14 may display a second sub-menu 310 (FIG. 6B). Via the second sub-menu, the user may choose "Full" for full satisfaction of the desirable features, "Proportional" for Proportional Mode, or "Best Pic" for Best Picture Mode. After such selection is made, a third sub-menu 320 (FIG. 6C) may offer the user the choice of whether to use the timer.

It will be appreciated that other menu systems are possible without departing from the scope of the present disclosure. Alternatively, one or more buttons of keypad 18 may be dedicated to various combinations of potential modes. Such dedications can be preset at the time of manufacture, and/or defined by the user.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of taking a photograph with a digital camera, comprising:
    setting a desirable feature for a desirable photograph;
    searching a field of view of the camera for a plurality of faces;
    determining whether each of the plurality of faces possesses the desirable feature;
    determining whether a predetermined proportion of the plurality of faces possesses the desirable feature, wherein the predetermined proportion is less than all of the plurality of faces; and
    upon determining that the predetermined proportion of the plurality of faces possesses the desirable feature, imaging a photograph.

2. The method of claim 1, wherein the desirable feature includes that a face in the field of view of the camera is smiling.

3. The method of claim 1, wherein the desirable feature includes that the eyes of a face in the field of view of the camera are open.

4. The method of claim 1, wherein the digital camera has a display, and further comprising:
    indicating in the display the presence of the plurality of faces within the field of view;
    locking onto the indicated faces simultaneously when the indicated faces include only the faces of the intended subject persons of a photograph;
    tracking the locked-on faces to determine when the predetermined proportion of the locked-on faces possesses the desirable feature; and
    imaging a photograph when the predetermined proportion of the locked-on faces possesses the desirable feature.

5. A method of taking a photograph with a digital camera, comprising:
    setting a desirable feature for a desirable photograph;
    receiving a time delay;
    following the time delay, searching the field of view of the camera for a plurality of faces;
    determining whether each of the plurality of faces possesses the desirable feature;
    determining whether a predetermined proportion of the plurality of faces possesses the desirable feature, wherein the predetermined proportion is less than all of the plurality of faces; and
    upon determining that the predetermined proportion of the plurality of faces possesses the desirable feature, imaging a photograph.

6. The method of claim 5 further, comprising alerting that a photograph has been taken.

7. A camera assembly comprising:
    a sensor for imaging a field of view;
    a memory that stores executable code; and
    a controller configured to execute the code to:
        receive an input of a desirable feature for a desirable photograph,
        search the output of the sensor representing a field of view of the camera for a plurality of faces,
        determine whether each of the plurality of faces possesses the desirable feature;
        determine whether a predetermined proportion of the plurality of faces possesses the desirable feature, wherein the predetermined proportion is less than all of the plurality of faces, and
        upon determining that the predetermined proportion of the plurality of faces possesses the desirable feature, image a photograph.

8. The camera assembly of claim 7, further comprising:
    a display;
    wherein the controller executes the code to indicate in the display the presence of the plurality of faces within the field of view; and
    wherein the controller further executes the code to lock onto the indicated faces simultaneously when the indicated faces include only the faces of the intended subject persons of a photograph, track the locked-on faces to determine when the predetermined proportion of the locked-on faces possess the desirable feature, and image a photograph when the predetermined proportion of the locked-on faces possess the desirable feature.

9. The camera assembly of claim 7, further comprising:
a timer, wherein the timer receives a time-delay input to delay the execution of the code by the controller; and
an alert that indicates when a picture has been taken.

10. The camera assembly of claim 7, wherein the desirable feature includes that a face in the field of view of the camera is smiling.

11. The camera assembly of claim 7, wherein the desirable feature includes that the eyes of a face in the field of view of the camera are open.

* * * * *